United States Patent Office 3,445,347
Patented May 20, 1969

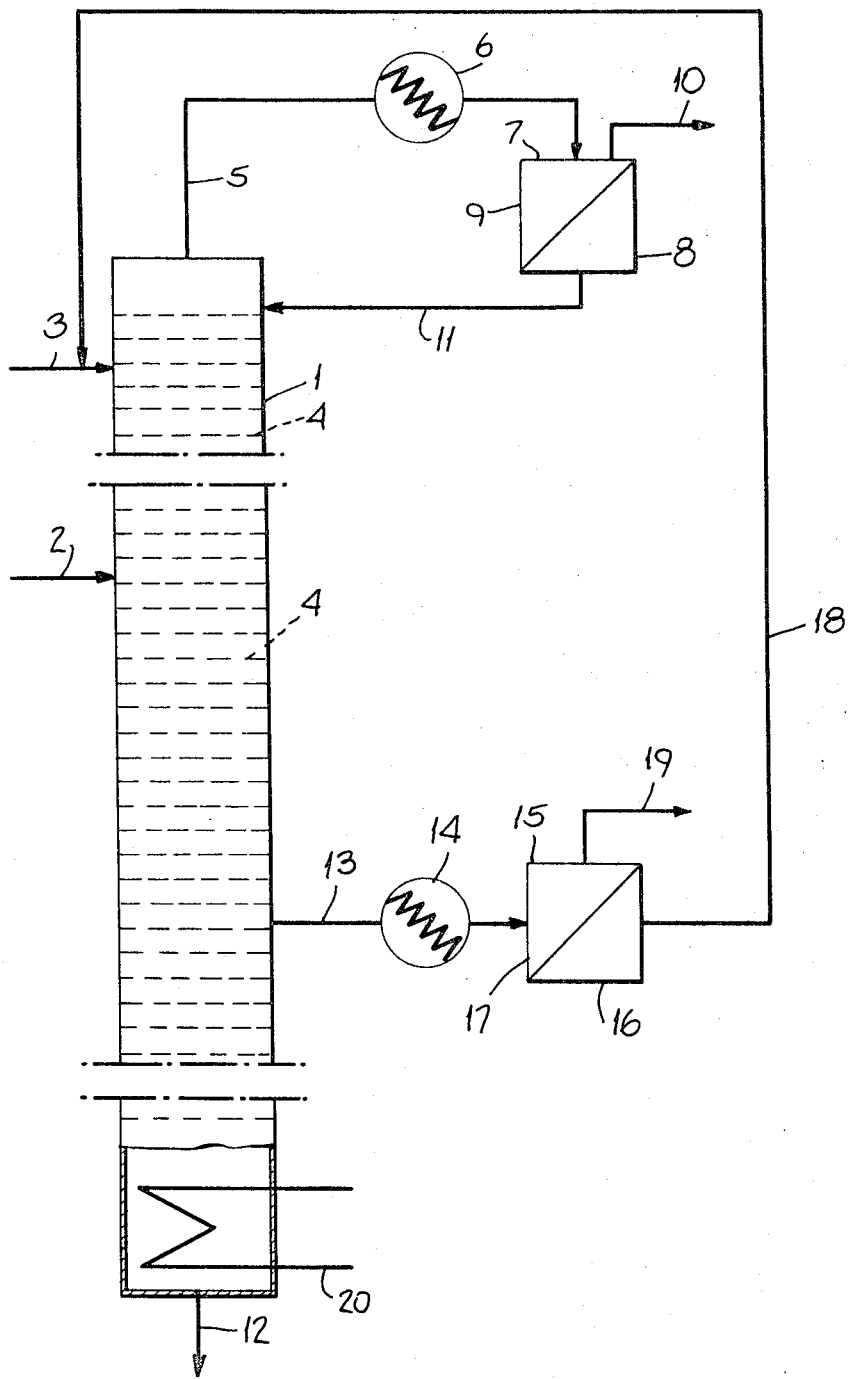

3,445,347
EXTRACTIVE DISTILLATION OF ACRYLONITRILE WITH SIDE STREAM IMPURITY WITHDRAWAL
Marcel Borrel, Oullins, Rhone, and Jean Konareff, Valmont, Moselle, France, assignors to Ugine Kuhlmann, Paris, France, a corporation of France
Continuation-in-part of application Ser. No. 516,103, Dec. 23, 1965. This application May 29, 1968, Ser. No. 733,002
Claims priority, application France, Dec. 24, 1964, 999,856
Int. Cl. B01d *3/40*; C07c *121/16*
U.S. Cl. 203—96          4 Claims

ABSTRACT OF THE DISCLOSURE

Extractive distillation process for the separation of acrylonitrile and acetonitrile from mixtures containing them together with higher nitriles and alcohols by removal of the higher nitriles and alcohols as a low side stream from the distillation zone and the removal of water with a minor amount of acetonitrile from the column as bottoms.

Related application

This application is a continuation-in-part of patent application Ser. No. 516,103, filed Dec. 23, 1965 and now abandoned.

Background of invention

This invention relates to the production of purified nitriles. More particularly, it relates to an extractive distillation process for the concurrent separation of purified acrylonitrile and acetonitrile from impure mixtures containing them.

Acrylonitrile is one of the most important of the modern industrial chemicals. It is produced in very large quantities, and is employed in the production of synthetic fibers and various other polymeric products, as well as in the synthesis of fine chemicals such as pharmaceuticals. Acetonitrile is also widely employed in industrial chemistry. A number of procedures have been developed for the production of these chemicals, and in many of them they are coproduced. In many of these procedures, a mixture is produced which, after preliminary purification to remove most of the impurities, will contain a major portion of acrylonitrile, a lesser portion of acetonitrile, as well as minor quantities of higher nitriles and alcohols containing up to five or more carbon atoms, particularly propionitrile, butene nitriles (vinyl acetonitrile and crotonitrile), butyronitrile, allylic alcohol, butanols, and the like. The small amount of acetonitrile must be eliminated. Often it is present in sufficient quantities so as to make its recovery as a purified product worthwhile.

The purity requirement for chemicals utilized in modern industrial applications have become more and more rigorous. This is especially so with acrylonitrile where, in many applications acrylonitrile having an acetonitrile content of less than 300 parts per million and a higher nitrile content of less than 50 parts per million is required. The specifications of purity for acetonitrile are often somewhat less strict than for acrylonitrile, but for many uses it is necessary that the acetonitrile be substantially free of higher nitriles and alcohols, and that the acrylonitrile content be less than 0.5% by weight.

Accordingly, a number of purification schemes have been devised for the purpose of purifying acrylonitrile containing higher nitriles and alcohols. Many of these processes comprise a series of successive distillations carried out so as to obtain pure acrylonitrile first, and simultaneously a mixture containing acetonitrile and other components which may be subjected to further purification procedures to obtain the acetonitrile and other components, if desired.

In one such process which is described in United States Patent No. 3,264,197, an acrylonitrile-acetonitrile mixture is subjected to a three step operation in which the mixture is first subjected to extractive distillation with water to produce an overhead fraction comprising acrylonitrile and water and a bottoms fraction which contains water, acetonitrile, and from 30 to 100 parts of acrylonitrile per 100 parts of acetonitrile. The extractive distillation procedure may be carried out under conditions such that excess water is withdrawn from the bottom of the column in a stream separate from that in which the water-acrylonitrile-acetonitrile is drawn out. In either event the three component mixture is concentrated in a distillation column to produce an overhead fraction which separates into two layers, an organic layer containing acetonitrile and an aqueous layer. The organic layer is collected and the components separated by distillation in a distillation column in which acetonitrile is collected as a bottom fraction. This procedure is not completely satisfactory for a number of reasons. The principal reasons are, (1) no provision is made for removing higher alcohols and nitriles, and experience has shown that these materials are carried through the process and are present in appreciable quantities in the acetonitrile ultimately collected; (2) it is a multi-step process, and (3) a certain amount of acrylonitrile must always be present in the fraction withdrawn from the first extractive distillation column otherwise it is not possible to collect an overhead fraction from the concentration-distillation column which will separate into two layers. This last factor means that, in a continuous process, relatively large quantities of acrylonitrile must be vaporized over and over again with the result that large amounts of heat energy must be produced and expended.

Another process for purifying mixtures containing acrylonitrile, acetonitrile, and higher nitriles is described in French Patent No. 1,138,154. This process involves the extraction of pure acrylonitrile from the initial mixture and the residual dilute solution containing a part of the acrylonitrile and all of the acetonitrile together with impurities, particularly higher nitriles, is concentrated and subsequently subjected to an extractive distillation in a column with water. An overhead distillate containing acetonitrile and acrylonitrile, and a bottom stream comprising a dilute solution of acetonitrile practically free of acrylonitrile, are obtained from the extractive distillation column.

These typical prior art processes provide acrylonitrile which is essentially free of acetonitrile, and one of them also produces acetonitrile essentially free of acrylonitrile.

However, they require the utilization of several successive pieces of equipment, and do not permit the production of acetonitrile freed from other impurities. These other impurities, e.g. higher nitriles and alcohols, must be removed by further purification steps. The descriptions of many prior art processes for obtaining purified acrylonitrile and acetonitrile are often silent on the separation of other impurities, but the fact is that these impurities are present and must be removed to produce products which can be employed in commercial operations having rigorous specifications for purity of starting materials.

The invention

Briefly, the process of this invention is an extractive distillation method for the concurrent separation of acrylonitrile and acetonitrile from impure mixtures containing them together with higher nitriles such as propionitrile, butene-nitriles, butyronitrile, and other ethylenic nitriles containing five or more carbon atoms, as well as alcohols, especially unsaturated alcohols such as allylic alcohol and higher alcohols which may contain four or more carbon atoms, for example, butanol. In the process the impure mixture is introduced into an intermediate section of an extractive distillation zone, for example, a column, and an aqueous extraction liquid is introduced into the higher section. A gaseous mixture of purified acrylonitrile and water is withdrawn from the top of the column. An aqueous solution containing acetonitrile which is substantially free from higher nitriles, alcohols and other impurities is withdrawn from the bottom of the column, and an aqueous fraction containing the undesired higher nitriles and alcohols is withdrawn from a zone located between the point of introduction of the mixture to be purified and the bottom of the column.

This single extractive distillation carried out in accordance with the process of this invention provides pure acrylonitrile as well as acetonitrile substantially free from entrained impurities and almost completely free of acrylonitrile. The impurities comprising higher nitriles, alcohols and other impurities are separated in an intermediate aqueous fraction containing small percentages of acrylonitrile and acetonitrile.

In describing this invention all proportions, percentages and ratios are by weight, unless otherwise indicated.

The preferred extraction liquid for use in the practice of this invention is water or a dilute aqueous solution. In one greatly preferred aspect of the invention, the extraction liquid is the dilute aqueous mixture obtained by mixing water with the aqueous phase obtained by decantation of the overhead condensate of acrylonitrile and water.

The extraction liquid is introduced into the top, i.e. at or near the top, of the distillation zone, and it has been discovered that it is possible to produce an overhead fraction which is substantially pure acrylonitrile-water azeotrope and a bottom fraction which is an aqueous solution of purified acetonitrile containing from about 0.2% to 8% acetonitrile, preferably 0.3 to 0.8% acetonitrile. The temperature gradient is maintained at from about 70° C. at the top of the distillation zone, to about 86° C. to 100° C., preferably 96° C. to 99° C., at the bottom, and it is possible to effect separation of substantially all of the impurities at a zone below the introduction zone and the bottom of the column. In one commercially available column the point of withdrawal of impurities is from about 5% to 10% of the height of the column, or from about 5 to 15 plates below the point of introduction of the pure liquid. For the same amount of extracting agent introduced, the height of the column above the point of introduction of the impure mixture does not affect the composition of the acetonitrile containing bottom product or of the impurities containing fraction. The temperature at the point or zone at which the impure fraction is withdrawn is normally from about 73° C. to 82° C.

The amount of water introduced into the extractive distillation column to form the extraction medium can vary within wide limits depending upon the composition of the product to be purified, the desired purity of the acrylonitrile, the number of absorption plates in the column and the amount of water contained in the aqueous phase derived from decantation of the overhead water-acrylonitrile fraction.

There are, therefore, three fractions obtained from the distillation zone in accordance with this invention. They are characterized as:

(1) An overhead fraction containing water and substantially pure acrylonitrile;

(2) An intermediate fraction containing water, higher nitriles, higher alcohols and other impurities, together with minor quantities of acrylonitrile and acetonitrile, and (3) A bottom fraction containing water and purified acetonitrile. The acetonitrile concentration of this solution depends upon the acetonitrile content of the original mixture and upon the amount of extraction water utilized, that is indirectly upon the number of adsorption plates of the column and the desired purity of the overhead product. This bottom fraction may also contain up to about 3% acrylonitrile based on the amount of acetonitrile present.

The purified acetonitrile, as aforesaid, is removed from the bottom of the distillation zone in the form of a dilute aqueous solution of acetonitrile. This solution is substantially free from the higher nitriles, alcohols and other impurities contained in the original mixture. It may contain up to 3% acrylonitrile based on its acetonitrile content. This percentage may be reduced to as low as about 0.03%, depending upon the manner in which the process is carried out. If the amount of extraction liquid is increased the quantity of acrylonitrile present in the bottom fraction will decrease.

The mixture to be purified is normally introduced near the top of the lowest third of the distillation zone. It may have, as is further described herein, substantially any relative proportions of acrylonitrile and acetonitrile without adverse effect on the quality of the purified products obtained in the overhead fraction and in the bottom fraction.

The purified acrylonitrile is recovered as an overhead fraction from the distillation zone in the form of an azeotropic mixture of water and acrylonitrile containing less than 50 parts per million of acetonitrile and less than 40 parts per million of other impurities. The gaseous mixture obtained from the overhead is cooled to condense it. The condensate is conducted to a decanter where it separates into two liquid phases, a lower aqueous phase and an upper organic phase. The organic phase comprises acrylonitrile saturated with water at the decantation temperature, and the aqueous phase comprises a dilute solution of acrylonitrile in water. Where dry acrylonitrile is desired the organic liquid phase can be dried by any of a number of known methods to obtain the desired organic compound in pure form.

Considering the complicated procedures which have heretofore been resorted to in order to attain these desirable results, it is most surprising to find that both acrylonitrile and acetonitrile can be obtained in high purity utilizing only one extractive distillation. These two valuable products are obtained, following the procedures of this invention, at a purity level rendering them directly useful in various known commercial applications.

Any of the known extraction columns can be employed, providing that the product to be purified is introduced and the impurities are withdrawn at the proper position in the column in accordance with the teachings of this invention.

The attached drawing schematically illustrates one form of extractive distillation column suitable for the practice of this invention. In the drawing the column is generally represented as 1. The impure feed mixture is introduced by pipe 2, and the aqueous extractive agent by pipe 3.

The column may contain a number of plates 4. The overhead fraction is taken off through pipe 5 and is directed through condenser 6 to decanter 7. In the decanter the condensed overhead fraction separates into two phases, an aqueous phase 8 and an organic phase 9. The organic phase consisting of substantially pure acrylonitrile saturated with water is withdrawn through pipe 10. The aqueous phase is returned through pipe 11 to the top of the column 1. At the bottom of column 1 the bottom fraction is drawn off through pipe 12. The impurities are drawn off through pipe 13 intermediate pipes 2 and 12. If desired, the impurities may be conducted through condenser 14 to decanter 15 to form an aqueous phase 16 and an organic phase 17. The aqueous phase may be conducted back to the top of column 1 through pipe 18, and the organic phase collected for possible further operations through pipe 19. A heat exchanger 20 may be employed to control the temperature in the column.

The following non-limiting examples are given by way of illustration only.

EXAMPLE I

This example illustrates the process of this invention in a 45 plate distillation column provided with a heat exchanger such as is illustrated in the drawing. In this example the plates are numbered from the bottom.

The following mixture is fed to the 13th plate of the distillation column at the rate of 33.3 kg./hr.

|  | Percent | Kg./hr. |
|---|---|---|
| Acrylonitrile | 92 | 30.65 |
| Acetonitrile | 4.2 | 1.4 |
| Water | 3.0 | 1 |
| Propionitrile, butyronitrile and butene nitriles | 0.3 | 0.11 |
| Allyl alcohol | 0.42 | 0.14 |
| Higher nitriles and alcohols | 0.05 | 0.01 |

Water in the amount of 260 kg./hr. is introduced at the 45th plate. A portion of the water is obtained by recycling the aqueous phase separated from the condensed gases removed from the top of the column.

The temperature at the bottom of the column is controlled by the heat exchanger so that it ranges from 98° C. at the 1st plate, to 77–78° C. at the 5th plate and 74° C. at the 8th plate. The temperature is approximately 70° C. at the head of the column.

In this embodiment of the invention practically all of the acrylonitrile is removed from the top of the column in the form of a gaseous mixture consisting essentially of acrylonitrile and water. This gaseous mixture is condensed, whereupon two liquid phases are produced. The upper liquid phase is pure acrylonitrile saturated with water and needs only to be dried if water-free acrylonitrile is required. The acrylonitrile so produced has an acetonitrile content below 0.006%, that is below 60 p.p.m., and a total content of other impurities below 0.004%, that is below 40 p.p.m.

The organic phase collected through 10, at the rate of 31.5 kg./hr. contained:

|  | Percent | Kg./hr. |
|---|---|---|
| Acrylonitrile | 96.8 | 30.5 |
| Acetonitrile | <0.002 | 0.05 |
| Water | 3.2 | 1.0 |

The bottom product collected through 12, at the rate of 261 kg./hr. contained:

|  | Percent | Kg./hr. |
|---|---|---|
| Acetonitrile | 0.5 | 1.31 |
| Acrylonitrile | 0.005 | 0.013 |
| Propionitrile | 0.002 | 0.052 |
| Allylic alcohol | 0.001 | 0.026 |
| Butenenitriles and higher nitriles and alcohols | Non-measurable | |
| Water | Remainder | |

The intermediate phase is collected at the 5th plate. It is cooled and decanted, and the aqueous phase is returned to the column as part of the extraction liquid. There remains an organic phase containing up to about 6% propionitrile, 7% crotonic nitrile and vinyl acetonitrile, and 2% of other higher ethylenic nitriles containing more than 5 carbon atoms.

The aqueous bottom solution collected at 12 and having the proportions of ingredients defined above is concentrated by distillation to obtain a water-acetonitrile azeotrope having approximately 1% acrylonitrile and less than 0.2% of other impurities in the acetonitrile.

EXAMPLE II

In the same distillation column as in Example I, the following mixture was fed to the 13th plate at the rate of 31.4 kg./hr.:

|  | Percent | Kg./hr. |
|---|---|---|
| Acrylonitrile | 91.3 | 28.7 |
| Acetonitrile | 3.6 | 1.13 |
| Water | 3.2 | 1.0 |
| Propionitrile | 0.8 | 0.25 |
| Butyronitrile and butene nitriles | 0.9 | 0.28 |
| Higher nitriles and alcohols | 0.2 | 0.06 |

Water in the amount of 280 kg./hr. was introduced onto the 45th plate.

The temperatures are maintained in the same ranges as in Example I.

The organic phase collected through 10, at the rate of 29.6 kg./hr. contained:

|  | Percent | Kg./hr. |
|---|---|---|
| Acrylonitrile | 96.6 | 28.6 |
| Water | 3.4 | 1 |
| Acetonitrile | <0.002 | 0.05 |

The bottom product collected through 12, at the rate of 281 kg./hr. was an aqueous solution containing:

|  | Percent | Kg./hr. |
|---|---|---|
| Acetonitrile | 0.4 | 1.11 |
| Acrylonitrile, propionitrile, butenenitriles, higher nitriles | Non-measurable | |
| Water | Remainder | |

The water-acetonitrile azeotrope obtained by concentration of this aqueous solution contained less than 0.05% of other nitriles in the acetonitrile.

The mixture collected at the 5th plate, at the rate of 0.7 kg./hr. had the following composition:

|  | Percent | Kg./hr. |
|---|---|---|
| Acrylonitrile | 12.5 | 0.1 |
| Acetonitrile | 2.5 | 0.02 |
| Propionitrile | 30.7 | 0.25 |
| Butyronitrile and butene nitriles | 35 | 0.28 |
| Higher nitriles and alcohols | 7.5 | 0.06 |
| Water | 11.8 | 0.09 |

What is claimed is:

1. An extractive distillation process for the concurrent separation of acrylonitrile and acetonitrile from an impure mixture containing them together with higher nitriles and alcohols which comprises introducing said impure mixture at an intermediate point in an extractive distillation column in which the temperature gradient from top to bottom is maintained at from about 70° C. to 100° C., introducing an aqueous extraction medium into the top of the column, withdrawing an acrylonitrile-water azeotrope as an overhead fraction, with drawing a bottom fraction containing water and from about 0.2% to 8% by weight of acetonitrile at the bottom zone of the column where the temperature is from about 86° C. to 100° C., and at a point between said intermediate point and the bottom of the column where the temperature is from about 73° C. to 82° C. withdrawing an impurities fraction containing water together with said higher nitriles and alcohols.

2. A process as in claim 1 wherein the acetonitrile content of the bottom fraction is from about 0.3 to 0.8%.

3. A process as in claim 1 wherein the bottom fraction is withdrawn at the bottom zone of the column at a temperature of from 96° C. to 99° C.

4. A process as in claim 1 in which the extractive distillation column is heated at the bottom.

References Cited

UNITED STATES PATENTS

| | | | |
|---|---|---|---|
| 2,681,306 | 6/1954 | Kemp et al. | 203—96 |
| 2,806,816 | 9/1957 | Starb et al. | 203—83 |
| 2,807,573 | 9/1957 | Robertson | 203—96 |
| 3,149,055 | 9/1964 | Houghland | 260—465.9 |
| 3,196,085 | 7/1965 | Dippel | 203—97 |
| 3,264,197 | 8/1966 | Schonbeck et al. | 203—85 |

WILBUR L. BASCOMB, JR., *Primary Examiner.*

U.S1 Cl. X.R.

203—98, 97, 99; 260—465.3, 465.9